No. 655,191. Patented Aug. 7, 1900.
R. A. BRINE.
MEANS FOR SECURING RUBBER TIRES TO VEHICLE WHEELS.
(Application filed June 27, 1900.)
(No Model.)
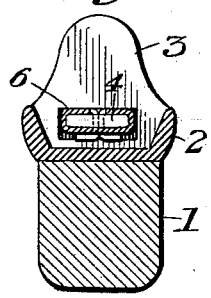
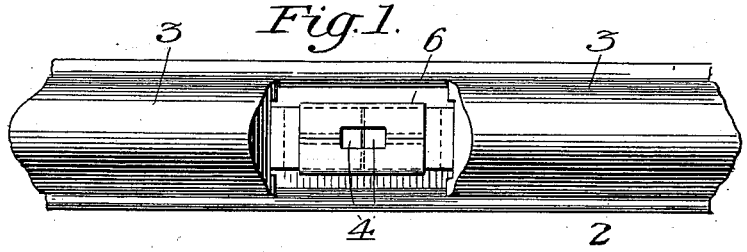
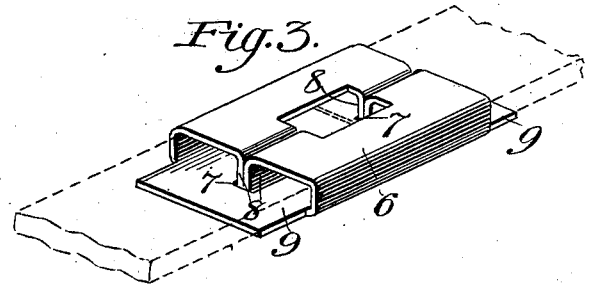
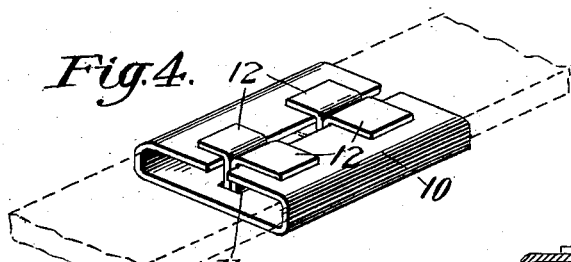
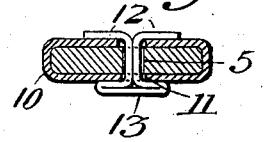
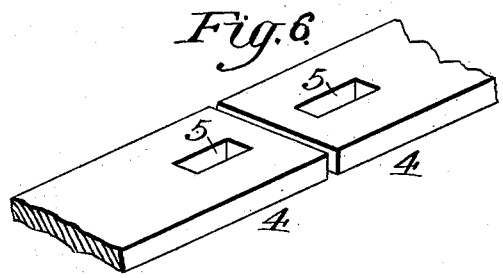
Witnesses:
D. W. Edelin.
Chas. H. Baker.
Inventor.
Richard A. Brine.
By F. E. Stebbins,
Atty.
THE NORRIS PETERS CO., PHOTO-LITHO., WASHINGTON, D. C.

UNITED STATES PATENT OFFICE.

RICHARD A. BRINE, OF REVERE, MASSACHUSETTS.

MEANS FOR SECURING RUBBER TIRES TO VEHICLE-WHEELS.

SPECIFICATION forming part of Letters Patent No. 655,191, dated August 7, 1900.

Application filed June 27, 1900. Serial No. 21,778. (No model.)

*To all whom it may concern:*

Be it known that I, RICHARD A. BRINE, a citizen of the United States, residing at Revere, in the county of Suffolk, State of Massachusetts, have invented certain new and useful Improvements in Means for Securing Rubber Tires to Vehicle-Wheels; and I do declare the following to be a full, clear, and exact description of the invention, which will enable others skilled in the art to embody and use the same.

My invention relates to means for securing rubber tires to vehicle-wheels, and especially to the metallic tape which is embedded in the tire, and means for uniting the free ends of the tape after the tire has been applied to the metallic channel and the tape drawn taut, the object being the provision of means for uniting the ends of the tape which shall be simple in construction and easily and quickly applied, which will obviate the necessity of cutting away or perforating the metallic tire or felly, which will not excessively weaken the tire at the point of union, and which shall possess other desirable features and characteristics constituting the same a superior instrumentality for performing the requisite functions.

With the above-mentioned ends in view my invention consists, objectively, in the combination, with a wheel having a rubber tire, of a tape provided with slots at its free ends, top and bottom plates, and means for uniting the ends of the tape and the plates.

It further consists in certain novelties of construction and combinations of parts hereinafter set forth and claimed.

The accompanying drawings illustrate two examples of the physical embodiment of my invention constructed according to the best modes I have so far devised for the application of the principle.

Figure 1 is a top plan view of a section of a wheel, showing the ends of the rubber tire some distance apart each from the other, the slotted metallic tape with its ends united, and a metallic channel within which the rubber tire is located. Fig. 2 is a cross-section of Fig. 1. Fig. 3 is an enlarged perspective view of the means employed to unite the ends of the tape, the tape itself being indicated by dotted lines. Fig. 4 illustrates a modification of the means for uniting the ends of the tape shown in Fig. 3, the tape being indicated by dotted lines and the parts enlarged. Fig. 5 is a cross-section of Fig. 4. Fig. 6 shows the slotted free ends of the tape, also enlarged.

Referring to the first example, (shown in Figs. 1, 2, 3, and 6,) the numeral 1 designates the felly; 2, the metallic channel; 3, the rubber tire; 4 4, the free ends of the tape; 5 5, slots in the free ends of the tape, and 6 is the securing means, consisting of a metallic plate or joint-plate fashioned so as to have slots 7 7, arms or prongs 8 8, and projecting ends 9 9. This joint-plate is bent to the form shown in Fig. 3, the ends of the tape inserted so that the slots 5 5 therein will register with the slots 7 7, and then the arms or prongs 8 8 are passed through both the slots 5 and 7 and bent down at right angles upon the back of the securing-plate.

In Fig. 4 the arms or prongs are made separate from the metallic plate. The numeral 10 designates the metallic plate. 11 11 are the slots, and 12 the arms or prongs, united by a head 13, as shown. The parts are assembled by passing the arms through the slots 11 11, the slots 5 5 of the tape, and then bending them down to the right and left upon the meeting edges of the plate, as clearly shown in Figs. 4 and 5.

In each of the two examples there is a top plate, a slotted bottom plate, and securing means consisting of arms or prongs, and the functions of the parts are substantially the same.

From the foregoing it is obvious that I have devised very simple means for uniting the free ends of a metallic tape, and which means fulfils all the conditions hereinbefore set forth as the object of my invention.

While I have illustrated only two examples of the physical embodiment of my improvement, I do not thereby intend to limit the scope of the invention to such specific examples, inasmuch as changes in shape, dimensions, and location and transposition of the parts may be introduced at the will of the manufacturer without constituting a substantial departure.

What I claim is—

1. The combination with a wheel, of a rubber tire; a slotted metallic tape; top and bottom plates in one piece; and arms or prongs passed through the slots and bent down.

2. The combination with a wheel, of a rubber tire; a slotted metallic tape; and an integral metallic plate having slots; and arms or prongs for uniting the several parts.

3. The combination with a wheel, of a rubber tire; a slotted metallic tape; and an integral metallic plate having slots, projecting ends, 9 9, and arms or prongs for uniting the several parts.

4. The combination with a wheel, of a rubber tire; a slotted metallic tape; an integral metallic plate having two slots and its edges bent and lapped over the sides of the free ends of the tape; and arms or prongs passed through the two slots in the plate and tape and the ends bent down.

RICHARD A. BRINE.

Witnesses:
FRED. H. KIDDER,
JOS. H. CAUGHEY.